(12) United States Patent
Daoud

(10) Patent No.: US 6,240,236 B1
(45) Date of Patent: May 29, 2001

(54) HIGH DENSITY SPLICE HOLDER

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,811

(22) Filed: Jul. 30, 1999

(51) Int. Cl.$^7$ ........................................... G02B 6/44

(52) U.S. Cl. .............................. 385/137; 385/136; 385/99

(58) Field of Search .................................. 385/136, 137, 385/95–99

(56) References Cited

U.S. PATENT DOCUMENTS 5,566,268 * 10/1996 Radliff et al. ........................ 385/137

* cited by examiner

Primary Examiner—Frank G. Font
Assistant Examiner—Michael P. Mooney
(74) Attorney, Agent, or Firm—Howard C. Miskin; Gloria Tsui-Yip

(57) ABSTRACT

A splice holder for securing and retaining fiber optic splices. The splice holder accommodates more splices than similar sized prior art splice holder by providing additional grooves. The splice holder comprises a plurality of parallel, spaced apart members extending from an integral base. Adjacent pairs of members defining a channel and interconnected passageway for retaining a splice. On each member between adjacent channels, a longitudinal groove located on a plane parallel to base and higher than channels and passageways is provided for retaining a splice, which increases the density of splices to be held on the splice holder.

6 Claims, 3 Drawing Sheets

HIGH DENSITY SPLICE HOLDER

FIELD OF THE INVENTION

The invention relates to a device for securing and retaining fiber optic splices which accommodates a higher density of splices than prior art splice holders.

BACKGROUND OF THE INVENTION

Telecommunications utilizing fiber optic technology improves the quality of communications and can handle a higher volume of voice and data transfer than similar sized copper electrical wiring and cables. To provide interconnections between widely separated points, splicing is required to join cables and wires. For example, splices are used commonly, in part, to interconnect subscribers to a telecommunication provider, such as a telephone service provider.

Two common types of fiber optic splices are the single fusion splice and the mass fusion splice, both generally known in the art of fiber optic technology. Single fusion splices have a smaller cross-sectional area and longer in length than mass fusion splices. Due to the need to maintain the quality of transmission over the spliced connection, splices are secured in some manner, such as in a splice holder, to prevent undesired agitation and/or damage. A splice holder also organizes and arranges the splices to facilitate identification and servicing by a technician whenever required. Splice holders are typically made of a foam material. Splice holders are placed on a fiber optic tray forming part of a distribution panel usually located in a basement of a subscriber.

A prior art splice holder that accommodates both single fusion and mass fusion splices may be further described with reference to FIG. 1. FIG. 1 shows a splice holder 10 comprising two groups of seven parallel, spaced apart members $11_1 \ldots 11_7$ extending upwardly from an integral base 12. Each corresponding adjacent pair of members of each group, such as $11_1$-$11_2$, defines a holding channel 13 and an interconnected passageway 14 therebetween.

Channel 13 and passageway 14 have cross-sectional areas generally corresponding to that of, respectively, a mass fusion splice and a single fusion splice to provide frictional hold. Each corresponding pair of channels $13_1$-$13_1$ and passageways $14_1$-$14_1$ from the two groups are in longitudinal axial alignment and cooperatively hold two ends of, respectively, a mass fusion splice and a single fusion splice (not shown). Each channel 13 and passageway 14 have constricted necks 15 and 16, respectively, along the top surface. Constricted necks 15 and 16 are dimensioned to be slightly narrower than the cross-sectional width of, respectively, a mass fusion splice and a single fusion splice to provide additional frictional hold.

The two groups of members 11 are spaced apart and interconnected with base 12, which provide access for a technician to pull splices from the splice holder 10 with a finger or a tool. Splice holder 10 typically further comprises a plastic housing (not shown) for mounting the base 12 to provide further structural support to splice holder 10.

Each channel 13 and passageway 14 is in the same plane parallel to the base such that the prior art splice holder 10 can accommodate up to only six splices, either single fusion or mass fusion splices, closely adjacent each other.

Therefore, there is a need for an improved splice holder for accommodating a higher density of splices.

SUMMARY OF THE INVENTION

The invention provides a holder for securing and retaining fiber optic splices. The improved splice holder of the present invention can securely accommodate a higher density of splices than prior art splice holder, without substantially increasing the size of such splice holder and yet allow ease of accessibility to the splices, whenever required.

The splice holder of the present invention is generally similar to the prior art splice holder described in the Background section herein, except that each member between two channels has an additional longitudinal groove for accommodating additional single fusion splices. Each groove is advantageously located at a plane parallel to base but higher than that of the channel and passageway and closer to the surface of the splice holder. Each groove has a cross-sectional area generally corresponding to that of a single fusion splice to provide frictional hold. Similar to the channels and passageways, the grooves also have constricted necks dimensioned to be slightly narrower than the cross-sectional width of either a single fusion or mass fusion splice to provide additional frictional hold. Although providing a higher density of splices, the present invention allows ease of accessibility to all the splices, whenever required.

It will be appreciated that, for purposes of illustration, these figures are not necessarily drawn to scale.

DETAILED DESCRIPTION OF THE PREFERRED EMBODIMENTS

Figure 1:
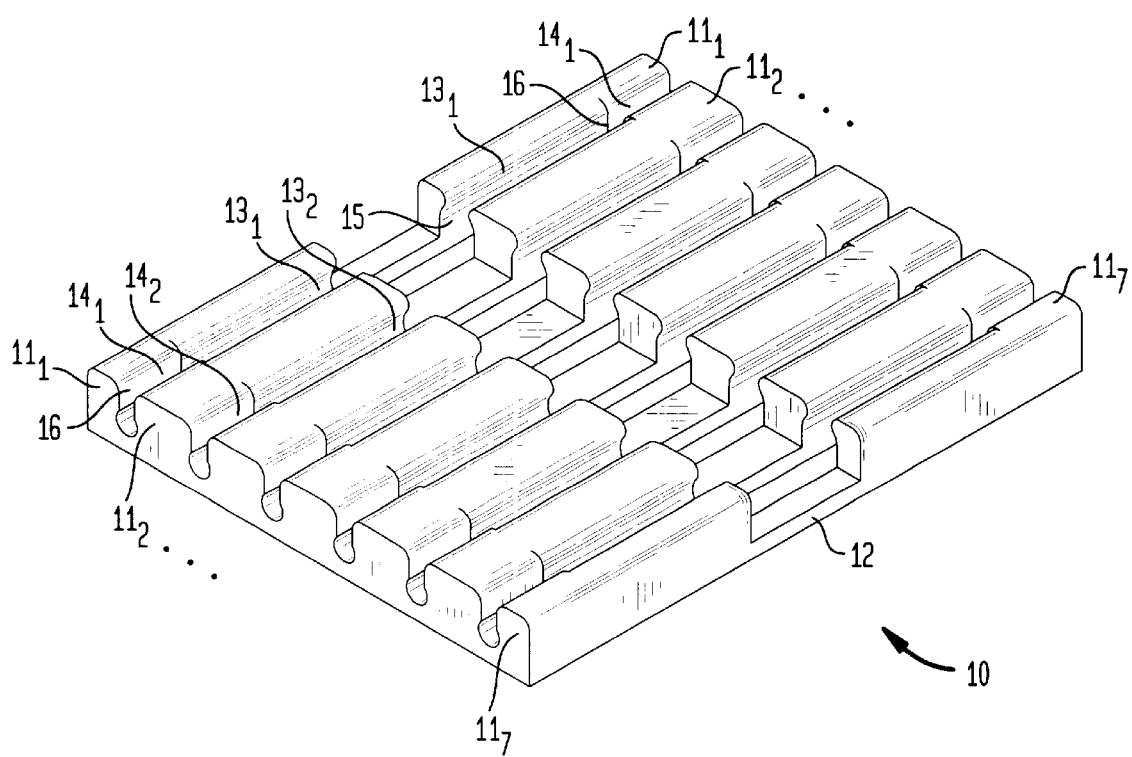
FIG. 1 is a perspective view of a prior art splice holder.
Figure 2:
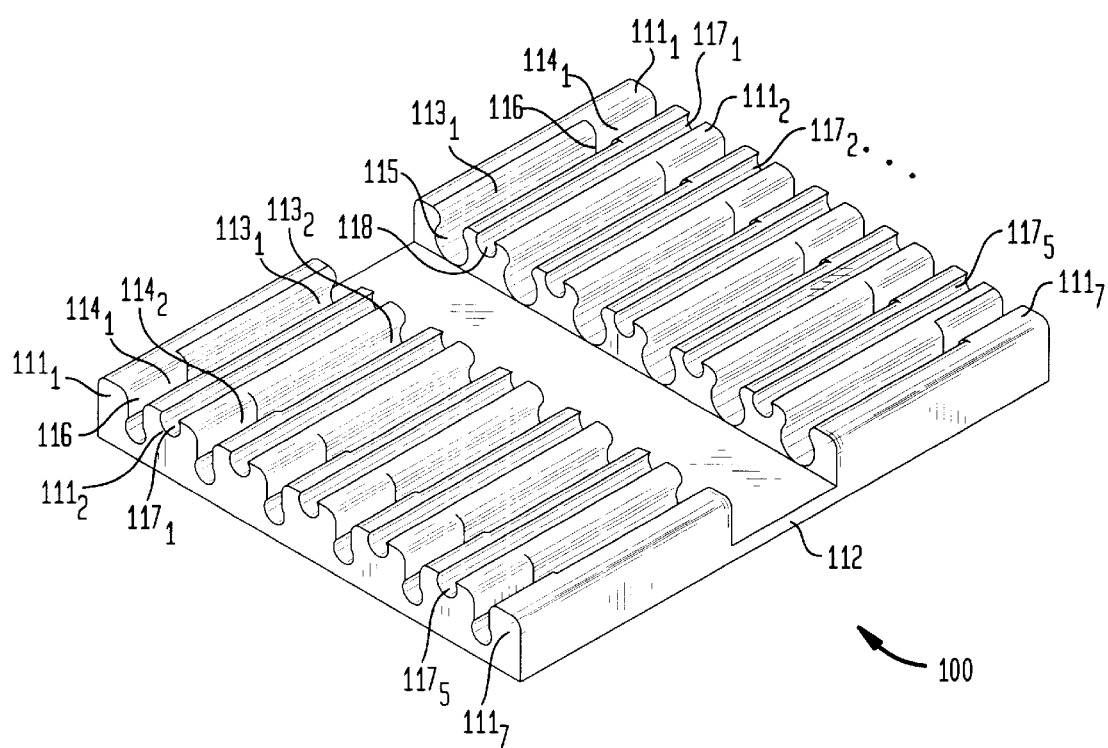
FIG. 2 is perspective view of a splice holder of the present invention.
Figure 3:
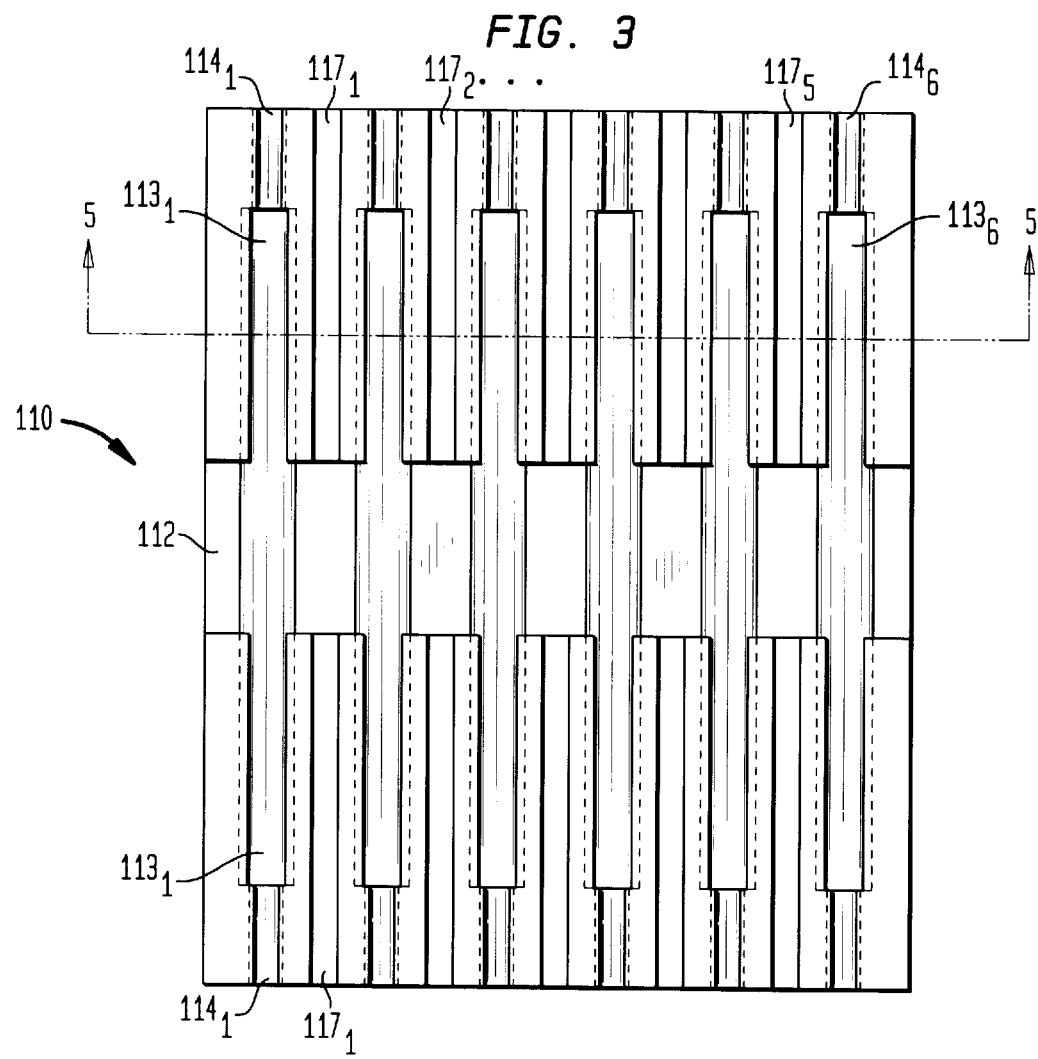
FIG. 3 is a top plan view of the splice holder of the present invention, illustrating two sets of spaced apart members in parallel alignment.

FIG. 2 illustrates a splice holder 100 of the present invention having many of the elements of the prior art splice holder 10 previously described with reference to FIG. 1, wherein the same elements of the splice holder 100 are correlated to the same elements of the splice holder 10 by reference numbers that are displaced from each other by a value of 100. An additional feature of splice holder 100 includes a plurality of longitudinal grooves 117 on each member 111 between adjacent channels 113. Each corresponding pair of grooves 117, one from each group of members 111, such as $117_1$-$117_1$, are in longitudinal axial alignment and cooperatively hold two ends of, respectively, a single fusion splice (best shown in FIGS. 3 and 5).

Figure 4:
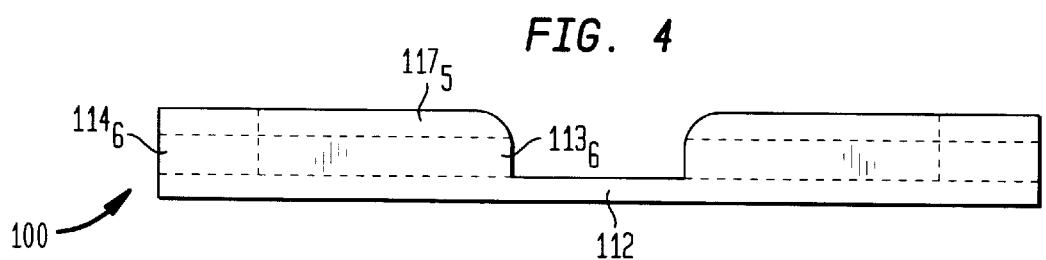
FIG. 4 is a side view of the splice holder of the present invention, illustrating two sets of members on both sides of the base.
Figure 5:
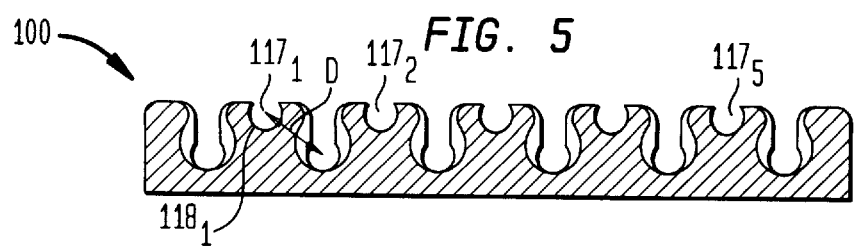
FIG. 5 is a cross-sectional view of the splice holder of the present invention taken along line 5—5 in FIG. 4.

As shown in FIG. 5, each groove 117 has a cross-sectional area generally corresponding to that of a single fusion splice to provide frictional hold. Similar to channels 113 and passageways 114, grooves 117 have constricted necks 118 dimensioned slightly narrower than the cross-sectional width of a single fusion splice for additional frictional hold. Each groove 117 is located at a plane parallel to base 112 and higher than channels 113 and passageways 114 (best shown in FIGS. 4 and 5). By raising the grooves 117 to a plane higher than channels 113 and passageways 114 instead of at the same plane allows the grooves 117 be placed closely adjacent channels 113 and passageways 114 without interfering with the structural integrity and resiliency of members 111 in retaining splices. Furthermore, the staggering of grooves 117 at a higher plane provides less mechanical interference because the distance D between adjacent splices are greater than if grooves 117 are at the same plane as channels 113 and passageways 114 such that removal of splices from grooves 117 would not interfere with splices located in channels 114 or passageways 114.

It can be seen that splice holder 100 of the present invention can accommodate five additional splices, almost twice the numbers of splices than prior art splice holder 10, without increasing the size of the holder itself. Although grooves 117 in FIGS. 2–5 are shown to be dimensioned for a single fusion splice, grooves can have larger cross-sectional areas dimensioned for mass fusion splices, provided that members 111 have sufficient width or thickness to accommodate wider grooves without disturbing the structural integrity and resiliency of members 111 for retaining splices.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A device for securing and retaining a plurality of fiber optic splices comprising:

a base having at least one set of a plurality of parallel, spaced apart members extending therefrom, each member having an upper surface;

each adjacent pair of said members defining a channel and an interconnected, axially aligned, passageway therebetween for retaining one of said splices;

at least one of said members between an adjacent pair of channels having an axially aligned longitudinal groove along said upper surface for retaining one of said splices;

each of said grooves being on a plane parallel to said base and higher than said channel and passageway.

2. The device according to claim 1 wherein each of said channels and passageways being on the same plane parallel to said base.

3. The device according to claim 2 wherein said splices having corresponding cross-sectional areas, wherein each of said channels, passageways and grooves having a cross-sectional area generally corresponding to said cross-sectional areas of said corresponding splices for frictional hold.

4. The device according to claim 3 wherein said splices further having corresponding cross-sectional widths, wherein each of said channels, passageways and grooves having a constricted neck dimensioned to be slightly narrower than said width of said corresponding splices for additional frictional hold.

5. The device according to claim 4 having first and second sets of a plurality of members, said base having first and second side wherein said first set of members extending from said first side and said second set of members extending from said second side such that each channel, passageway and groove from said first set is in longitudinal axial alignment with a corresponding channel, passageway and groove, respectively, from said second set to cooperatively secure said splice.

6. The device according to claim 5 wherein said base and members are made of a foam material.

* * * * *